US012572827B2

(12) United States Patent
Dong et al.

(10) Patent No.: US 12,572,827 B2
(45) Date of Patent: Mar. 10, 2026

(54) ARTIFICIAL INTELLIGENCE (AI) MODEL DEPLOYMENT

(71) Applicant: International Business Machines Corporation, Armonk, NY (US)

(72) Inventors: Lin Dong, Beijing (CN); Dong Xie, Beijing (CN); Jing Li, Beijing (CN); Guang Han Sui, Beijing (CN); Xiao Tian Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 17/387,125

(22) Filed: Jul. 28, 2021

(65) Prior Publication Data

US 2023/0031636 A1      Feb. 2, 2023

(51) Int. Cl.
*G06N 5/04*          (2023.01)
*G06F 11/34*          (2006.01)
*G06F 16/901*          (2019.01)

(52) U.S. Cl.
CPC ........... G06N 5/04 (2013.01); G06F 11/3442 (2013.01); G06F 16/9024 (2019.01)

(58) Field of Classification Search
CPC .. G06N 5/04; G06N 3/10; G06F 11/34; G06F 16/901; G06F 2201/865; G06F 8/60
See application file for complete search history.

(56) References Cited

U.S. PATENT DOCUMENTS

| | | | | | |
|---|---|---|---|---|---|
| 6,604,110 | B1 * | 8/2003 | Savage | ................. | G06F 16/254 |
| | | | | | 707/999.102 |
| 6,850,925 | B2 * | 2/2005 | Chaudhuri | ........ | G06F 16/24545 |

| | | | | | |
|---|---|---|---|---|---|
| 7,493,311 | B1 * | 2/2009 | Cutsinger | ........... | G06F 16/2471 |
| 11,605,447 | B2 * | 3/2023 | Passerini | ................ | G16H 10/60 |
| 11,748,634 | B1 * | 9/2023 | Kulkarni | ................. | G06F 18/21 |
| | | | | | 707/722 |
| 2009/0158275 | A1 * | 6/2009 | Wang | .................... | G06F 9/5077 |
| | | | | | 718/1 |
| 2012/0147784 | A1 * | 6/2012 | Guo | .................... | H04L 67/1097 |
| | | | | | 370/254 |

(Continued)

FOREIGN PATENT DOCUMENTS

CN          112394950 A          4/2021

OTHER PUBLICATIONS

Abulazm, "TensorFlow: How to export, freeze models with python API and deploy models withC++ API." Dec. 28, 2018. 10 Pages.

(Continued)

*Primary Examiner* — Phenuel S Salomon
(74) *Attorney, Agent, or Firm* — Cantor Colburn LLP; Teddi Maranzano

(57)          ABSTRACT

Aspects of the invention include systems and methods configured to provide simplified and efficient artificial intelligence (AI) model deployment. A non-limiting example computer-implemented method includes receiving an AI model deployment input having pre-process code, inference model code, and post-process code. The pre-process code is converted to a pre-process graph. The inference model and the post-process model are similarly converted to an inference graph and a post-process graph, respectively. A pipeline path is generated by connecting nodes in the pre-process graph, the inference graph, and the post-process graph. The pipeline path is deployed as a service for inference.

17 Claims, 11 Drawing Sheets

300

(56) References Cited

U.S. PATENT DOCUMENTS

| | | | | |
|---|---|---|---|---|
| 2013/0232463 | A1* | 9/2013 | Nagaraja ................... | G06F 8/70 |
| | | | | 717/101 |
| 2015/0379429 | A1* | 12/2015 | Lee .......................... | G09B 5/00 |
| | | | | 706/11 |
| 2018/0032570 | A1* | 2/2018 | Miller ................. | G06F 16/2455 |
| 2021/0081720 | A1* | 3/2021 | Polleri ............... | G06F 18/2155 |
| 2021/0097444 | A1* | 4/2021 | Bansal .................. | G06F 9/5066 |
| 2022/0138004 | A1* | 5/2022 | Nandakumar ........... | G06N 5/01 |
| | | | | 718/102 |
| 2023/0259817 | A1* | 8/2023 | Grayson ............... | G06F 11/323 |
| | | | | 706/12 |

OTHER PUBLICATIONS

Anonymous, "Deploy an Inference Pipeline." https://docs.aws.amazon.com/sagemaker/latest/dg/inference-pipelines.html. Apr. 21, 2021, 2 Pages.
Anonymous, "KFServing" https://github.com/kubeflow/kfserving. 2021. 8 Pages.
Anonymous, "ML Inference on Edge devices with ONNX Runtime using Azure DevOps." Open Data Science, Nov. 6, 2020. 7 Pages.
Anonymous."ONNX" https://onnx.ai/. 2019. 3 Pages.
Fromer, "Machine Learning Model Deployment Patterns in a nutshell." Mar. 20, 2021. 6 Pages.
Moldovan et al. "AutoGraph: Imperative-style Coding with Graph-based Performance" https://arxiv.org/abs/1810.08061. Mar. 26, 2019.3 Pages.
Perminov et al., "Merging Pre and Postprocessing into the mode."(https://opencv.org/author/alexeyperminov/) Dec. 25, 2020. 16 Pages.

* cited by examiner

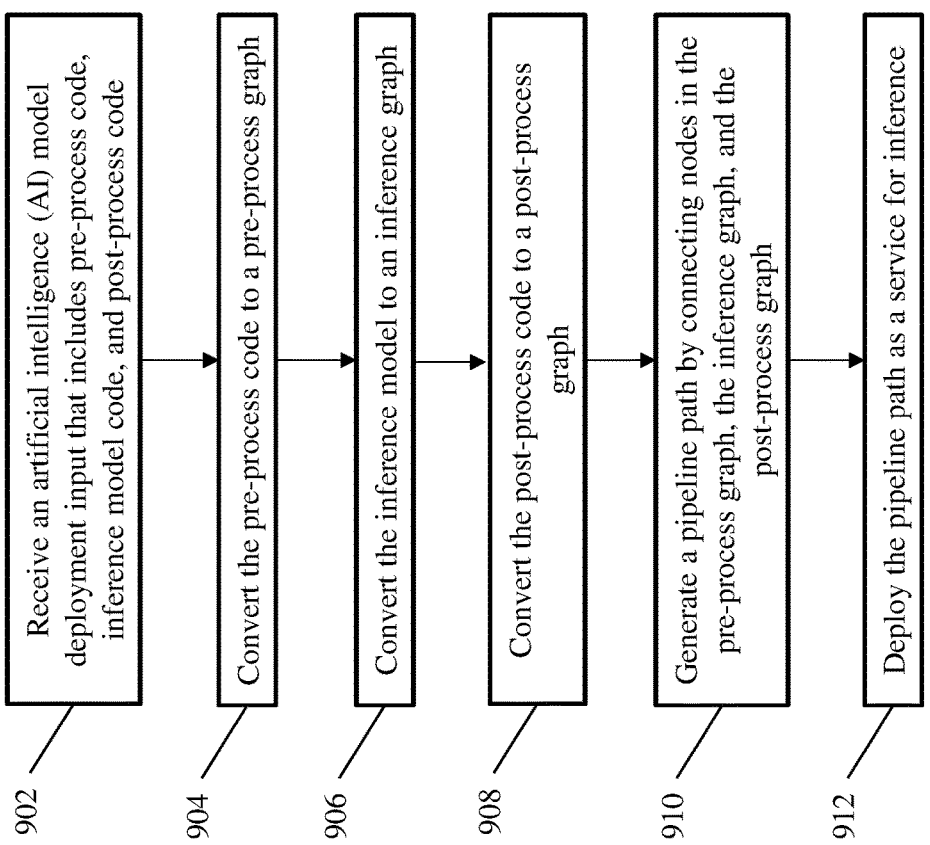

Receive an artificial intelligence (AI) model deployment input that includes pre-process code, inference model code, and post-process code — 902

Convert the pre-process code to a pre-process graph — 904

Convert the inference model to an inference graph — 906

Convert the post-process code to a post-process graph — 908

Generate a pipeline path by connecting nodes in the pre-process graph, the inference graph, and the post-process graph — 910

Deploy the pipeline path as a service for inference — 912

ARTIFICIAL INTELLIGENCE (AI) MODEL DEPLOYMENT

BACKGROUND

The present invention generally relates to artificial intelligence (AI), and more specifically, to computer systems, computer-implemented methods, and computer program products for simplified and efficient AI model deployment.

The continuous development of big data and other computationally difficult fields has strained the capabilities of conventional computing processing systems. The emergence of big data has prompted research into different ways to analyze, systematically extract information from, or otherwise deal with data sets that are too large or complex to be dealt with by traditional data-processing application software. Big data challenges include capturing data, data storage, data analysis, search, sharing, transferring, data visualization, querying, updating, privacy, and sourcing.

Recent advancements in the fields of machine learning and artificial intelligence have provided an entirely new set of tools that can be used to solve these otherwise difficult or impossible problems. AI-based models and algorithms increasingly outperform humans and conventional computing systems in an increasingly wide range of applications, such as, for example, computer vision and healthcare (e.g., automated diagnoses). Due to these successes, the use and development of machine learning and/or artificial intelligence-based models to solve various problems is rapidly increasing in popularity. The use of an AI model follows a two-phase pattern: a model training phase and a model deployment phase (otherwise known as an application phase).

SUMMARY

Embodiments of the present invention are directed to simplified and efficient artificial intelligence (AI) model deployment. A non-limiting example method includes receiving an AI model deployment input having pre-process code, inference model code, and post-process code. The pre-process code is converted to a pre-process graph. The inference model and the post-process model are similarly converted to an inference graph and a post-process graph, respectively. A pipeline path is generated by connecting nodes in the pre-process graph, the inference graph, and the post-process graph. The pipeline path is deployed as a service for inference.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 is a flowchart in accordance with one or more embodiments of the present invention;

DETAILED DESCRIPTION

Figure 1:
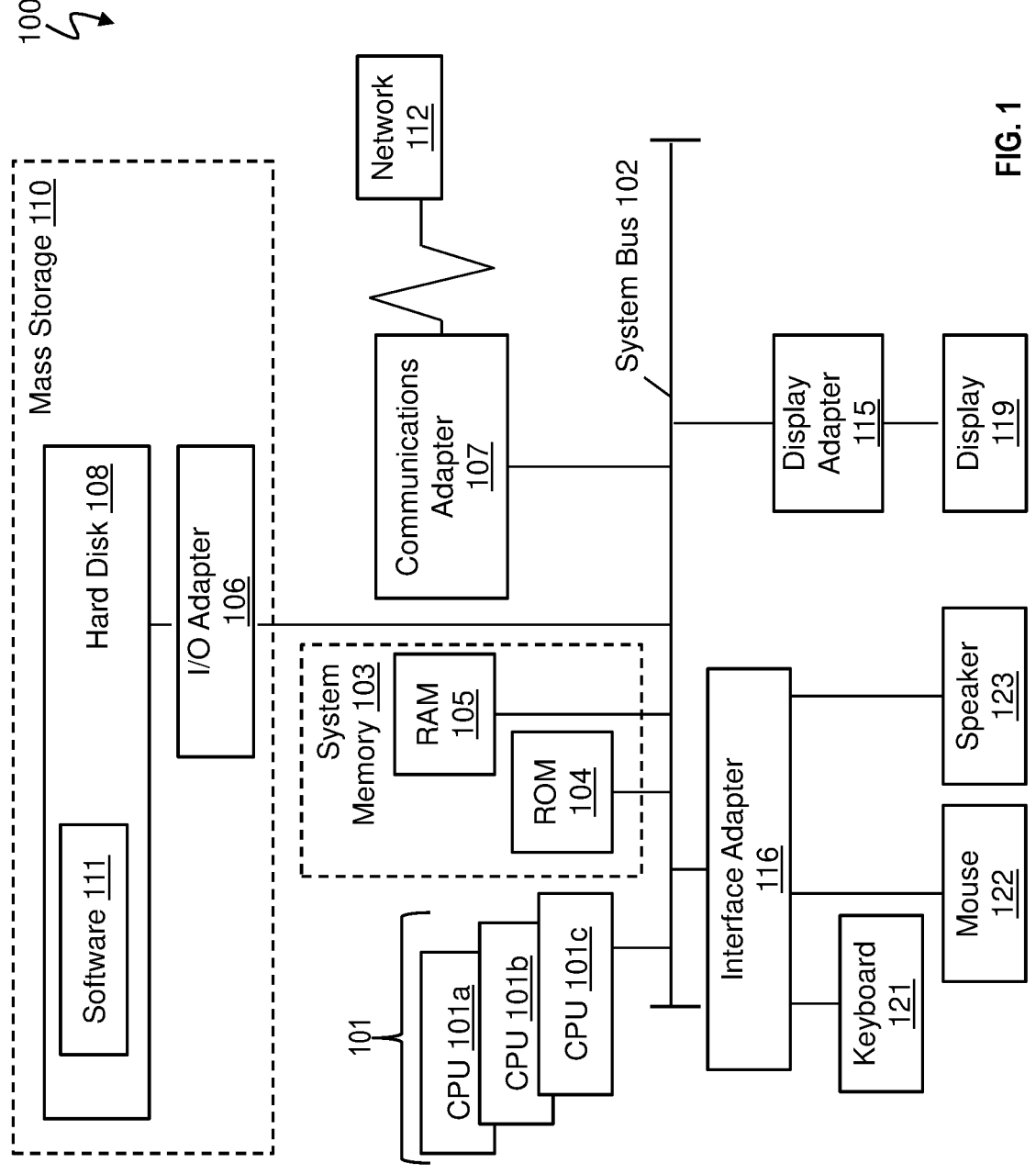
FIG. 1 depicts a block diagram of an example computer system for use in conjunction with one or more embodiments of the present invention.

Artificial intelligence (AI) models are increasingly used to solve or otherwise handle computationally complex problems, such as, for example, data capture, storage, analysis, and visualization for big data. When an AI model is successfully trained and validated (i.e., shown to be a good model against some test data), it needs to be deployed in some manner so that the AI model can be accessed and leveraged against one or more datasets. For example, an AI model can be deployed as a service that accepts requests for inference.

Data formatting issues are a constant challenge with AI model deployments. As an initial matter, the AI model itself may only accept some predefined or otherwise particular data format. Complicating things further, the output of the model will also have some predefined data format. These input and output data formats do not necessarily align with the incoming and outgoing data format requirements of the party accessing the model. Moreover, in many scenarios, these data formats need not even be human-understandable or interpretable. For example, the output of an AI model can be purely numerical without context. Accordingly, the successful deployment of an AI model in the real world requires some pre-processing and post-processing to ensure data compatibility. These pre-processing and post-processing requirements are generally added to an overall AI model pipeline to make the model useable.

One possible AI model pipeline for a service provided in a client/server arrangement includes a pre-processor, normally run on the client side (sometimes referred to as TF serving) or server side (sometimes referred to as KF serving) through some intermediary code, the model itself, and a post-processor, which, similarly to the pre-processor, can be run on the client side or server side through some code. In some configurations, the pre-processor is run client-side, while the post-processor is run server-side, or vice versa. The AI model itself normally will be executed at the server side by some framework, for example, as a flexible, high-performance serving system for machine learning models (e.g., as a freeze graph, Open Neural Network Exchange (ONNX) format, or as some code directly with a deep learning library).

There are some challenges with this type of pipeline arrangement. It can be very complicated to contain the runtime (e.g., modules, libraries, etc.) required by the whole pipeline, especially when pre/post processing is provided strictly by code alone. Unfortunately, containers are not as helpful here as would be expected, due to the arbitrarily large number of different images and/or runtimes needed to be maintained to ensure deployment. A somewhat related issue is that it is hard to run different workloads in a shared environment, with or without a container. Without a container, the compatibility issue is very easy to be triggered as different workloads have different data requirements (e.g., depend on different library versions, different OS environments, etc.). There will be runtime conflicts among these workloads. On the other hand, with a container, there will be massive images for these containers from different workloads, and addressing how to build/maintain these images and how to transfer these images from a local environment to the shared environment (usually in a cloud) through the internet is a problem. Another issue is that the data flow through the pipeline itself can be slow and time consuming, increasing latency.

One or more embodiments of the present invention address one or more of the above-described shortcomings by providing computer-implemented methods, computing systems, and computer program products configured for simplified and efficient AI model deployment. Embodiments of the present invention provide a mechanism to convert a mixed-model inferencing pipeline into a standard graphed model. To build the standard graphed model, the pre/post process code is converted into graphs with predefined and/or extensible operators. For example, pre-process code (e.g., python, c, etc.) for decoding and resizing an image (e.g, img=cv2.imdecode (nparr); img=cv2.resize(img, (h,w)); img/=255.0) can be converted into nodes on a graph that abstracts away from the underlying codebase (e.g., a graph having nodes "image decoder", "image resize", "nd-array divide", etc.). The post-process code (e.g., python, c, etc.) can be similarly converted to a graph. The inference model itself will often already be in graph form but can be similarly converted if needed. Finally, the pre-process, inferencing, and post-process graphs are connected together as one graph-based pipeline. The pipeline can then be deployed based on the available resources and communication overhead between the various child nodes/graphs. Advantageously, the graphed model will be independent of any particular runtime for execution, greatly simplifying deployment.

In some embodiments of the invention, an AI model serving module is created to manage the pipeline feed and output. The serving module can operate as a service that takes in a raw input for inference and provides output data that is natively suited to the next process (e.g., next model, final client-side interpretation, etc.). Such an approach greatly improves AI model serving, as, for the AI model user, there is no need to be concerned with where and how the pre and post process will be executed; instead, clients can focus solely on the overall input and output of the whole pipeline.

In some embodiments of the invention, a cost model is built to decide the allocation and connection of different pipeline components (i.e., nodes) of the graph to reduce, if possible, the overhead of communication. In other words, rather than naively placing all nodes of the graph-based pipeline in the strict order offered, a dynamic placement policy can be leveraged to estimate end-to-end latency for inference, based on which an efficient graphed model placement policy can be decided. Continuing with the prior example, the "image resize" node can be connected directly to a transmit operator node (rather than the "nd-array divide" node), if the latency can be improved by shifting the "nd-array divide" operation further down the graph.

Advantageously, a graph-based AI model deployment system configured according to one or more embodiments offers several technical solutions over conventional deployment approaches. As an initial matter, inference is the key and normally final step of AI enablement, as the inference itself is the primary purpose for the model creation and training work. Existing solutions focus a lot on the AI model itself but pay less attention to the end-to-end adoption of the AI model (i.e., model deployment). The present system offers a relatively simple way to deploy AI model pipelines efficiently in a manner which relieves the client of many prior responsibilities, such as, for example, data formatting, which will help end users accelerate their AI adoption, increasing product capability and competitiveness. Moreover, embodiments of the present invention simplify the server-side runtime dependencies for AI model end-to-end inferencing and overcome or bypass the communication bottlenecks often experienced between different components in an AI model pipeline.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 9 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM)

104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
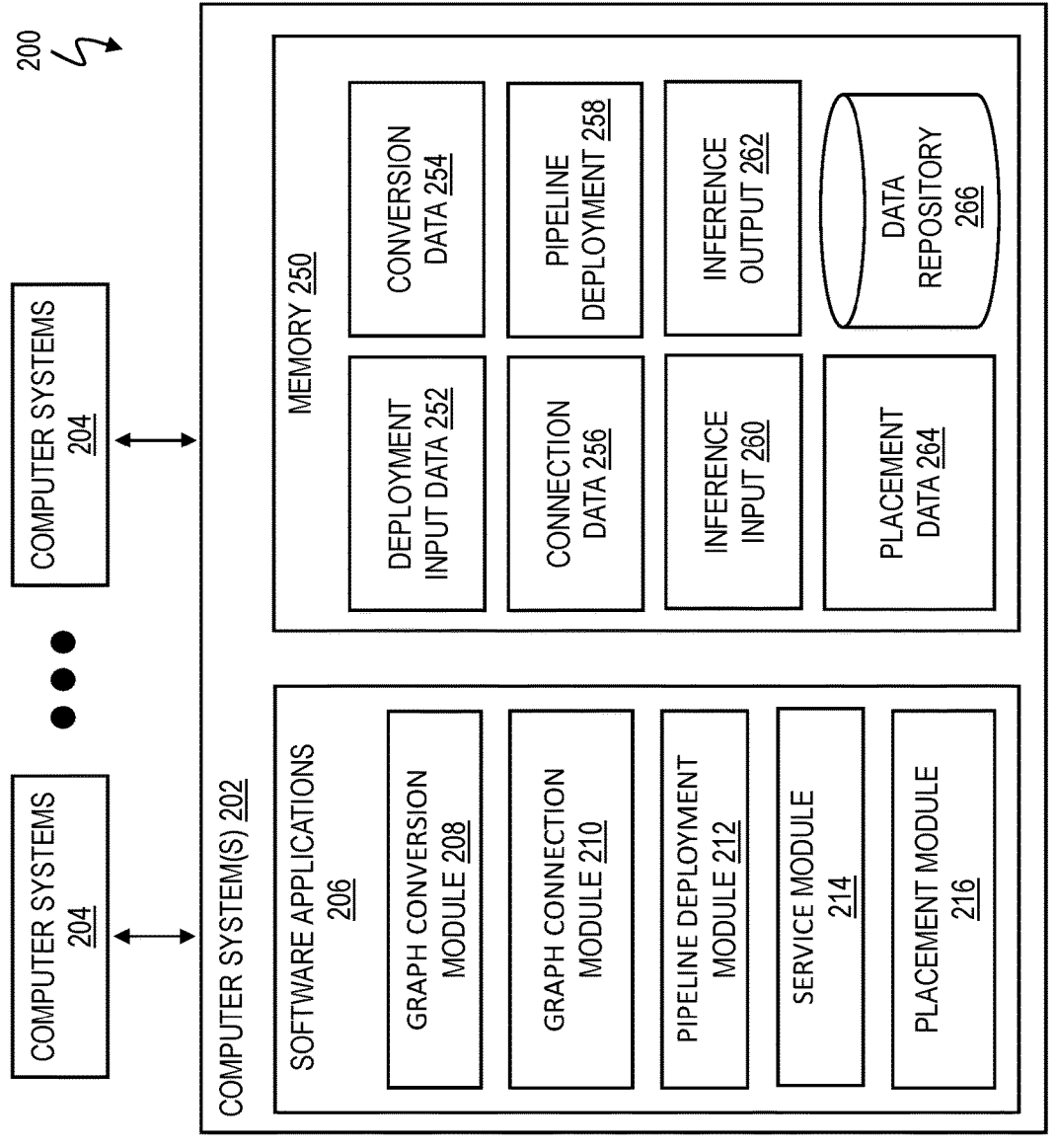
FIG. 2 is a block diagram of a system for a simplified and efficient AI model deployment in accordance with one or more embodiments of the present invention.

FIG. 2 is a block diagram of a system 200 for a simplified and efficient AI model deployment in accordance with one or more embodiments of the present invention. FIG. 2 depicts one or more computer systems 202 coupled to one or more computer systems 204 via a wired and/or wireless network. For example, computer system 202 can be representative of one or more cloud-based resources (e.g. remote computers, etc.), and computer systems 204 can be representative of numerous client (local) computers. One or more of the computer systems 202 can be configured to deploy an AI model for use by one or more computer systems 204. Elements of the computer system 100 of FIG. 1 may be used in and/or integrated into computer systems 202 and computer systems 204. In some embodiments of the invention, computation is done directly at the local level. In other words, elements of the computer system 202 can instead (or in addition) be elements of the computer systems 204.

Figure 3:
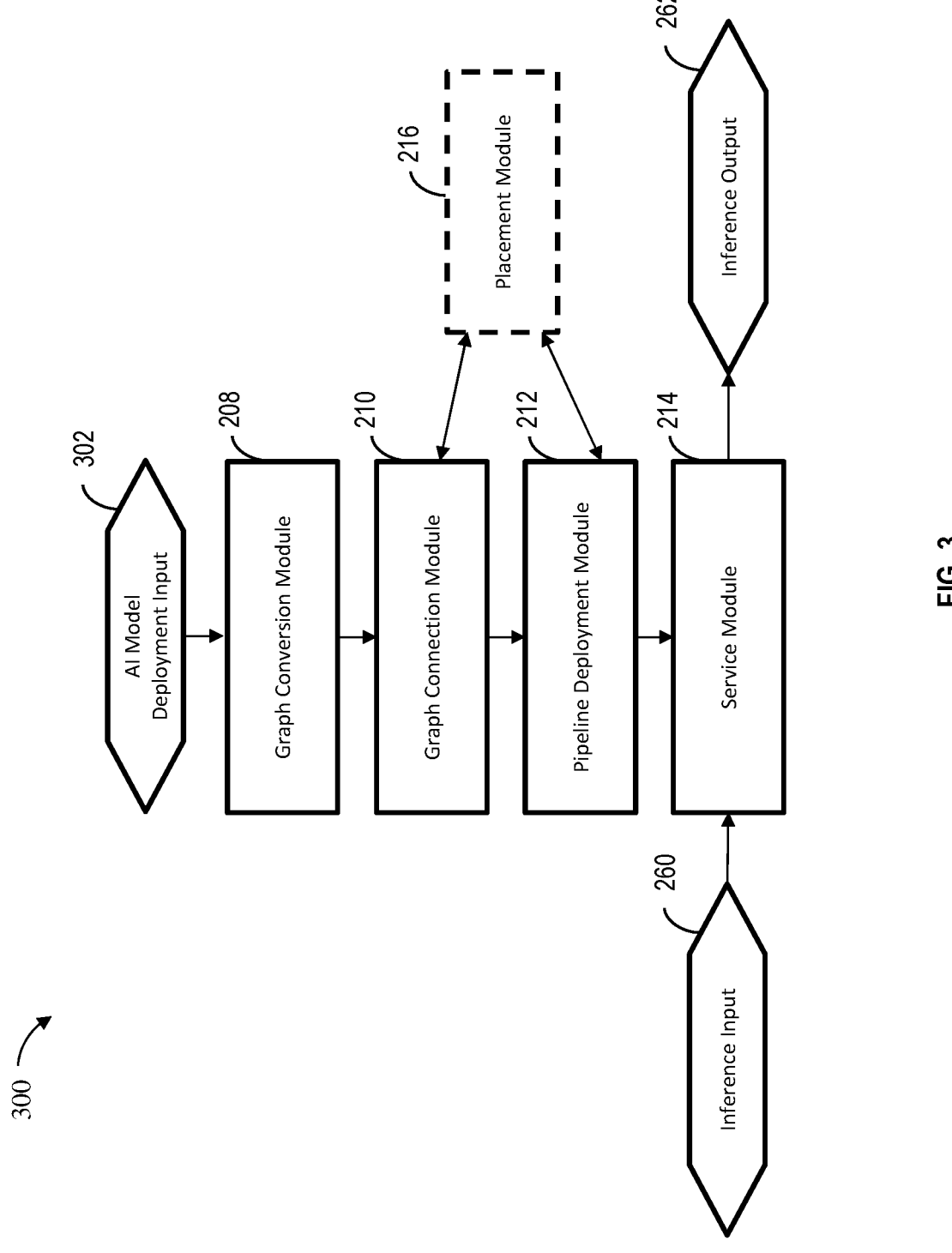
FIG. 3 is a block diagram of a dataflow for a simplified and efficient AI model deployment in accordance with one or more embodiments of the present invention.

The software applications 206 can include a graph conversion module 208, a graph connection module 210, a pipeline deployment module 212, a service module 214, and a placement module 216. The software applications 206 may utilize and/or be implemented as software 111 executed on one or more processors 101, as discussed in FIG. 1. Memory 250 of the computer systems 202 can store, for example, deployment input data 252, conversion data 254, connection data 256, pipeline deployment 258, inference input 260, inference output 262, placement data 264, and a data repository 266 (e.g., codebase, API, annotations, etc.). A dataflow 300 of FIG. 3 illustrates interactions between various components of the software applications 206 and memory 250 of FIG. 2 for deploying an AI model.

In some embodiments of the invention, the graph conversion module 208 is configured to receive AI model deployment input 302. The AI model deployment input 302 can be retrieved from a preconfigured resource, such as a database (e.g., data repository 266). In some embodiments of the invention, the AI model deployment input 302 can be provided by a user of the computer systems 202 and/or 204.

The AI model deployment input 302 can include the raw structural data required for initializing a model deployment. For example, the AI model deployment input 302 can include the pre-process code (e.g., python, c, hardware accelerated code, etc.) and post-process code (e.g., python, c, hardware accelerated code, etc.) required to process raw input data (e.g., incoming from the computer systems 204) or raw output data (e.g., raw output data from the respective AI model). In some embodiments of the invention, the AI model deployment input 302 further includes a selection for a particular inference model.

Figure 4:
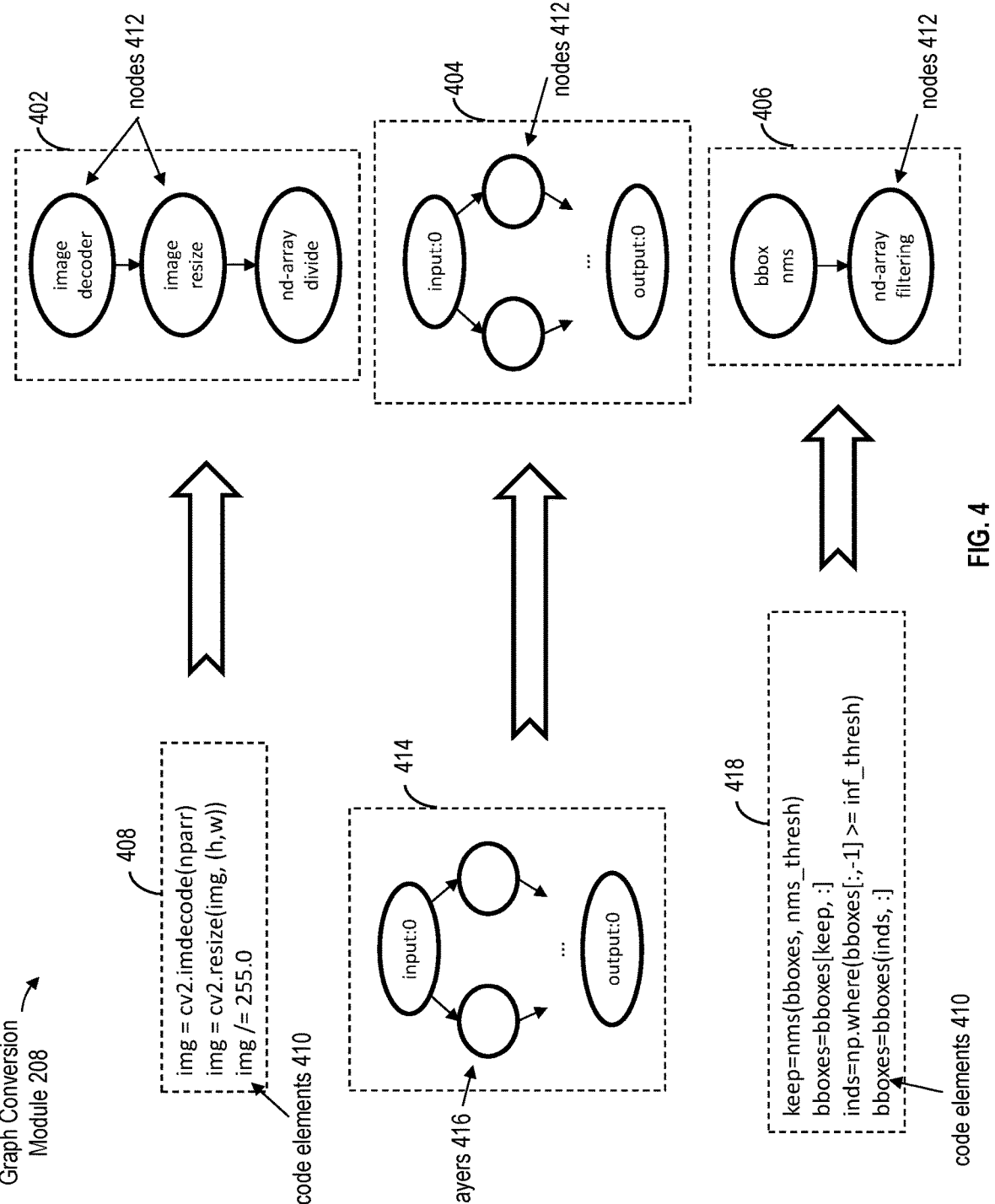
FIG. 4 illustrates an example graph conversion module in accordance with one or more embodiments of the present invention.

In some embodiments of the invention, the graph conversion module 208 is configured to convert the pre-process code, inference model, and post-process code into a pre-process graph 402, inference graph 404, and post-process graph 406, respectively. In some embodiments of the invention, the pre-process graph 402, inference graph 404, and post-process graph 406 are stored as conversion data 254. FIG. 4 provides a more detailed view of the graph conversion module 208.

As shown in FIG. 4, pre-process code 408 having code elements 410 (here, e.g., three lines of code, each associated with a different code function) is converted into one or more nodes 412 in the pre-process graph 402. In some embodiments of the invention, the default sequencing (order) of the nodes 412 can be naively pulled from the order of the code elements 410 in the pre-process code 408. In some embodiments of the invention, this naive approach is replaced by the placement module 216 (discussed further with respect to FIG. 8). In some embodiments of the invention, each of the code elements 410 is mapped to a single node of the nodes 412 (as shown). In some embodiments of the invention, two or more of the code elements 410 are mapped to the same node of the nodes 412 (not shown).

As further shown in FIG. 4, inference model code 414 is converted into one or more nodes 412 in the inference graph 404. In some embodiments of the invention, the inference model code 414 is a machine learning model having one or more connected layers 416 (e.g., hidden layers of a neural network). In some embodiments of the invention, the connections between the layers in the machine learning model define a graph (as shown). In other words, in some embodiments of the invention, the inference model code 414 can be passed directly to the inference graph 404, as the data is already in graph form.

As further shown in FIG. 4, post-process code 418 having code elements 410 (here, e.g., four lines of code) is converted into one or more nodes 412 in the post-process graph 406. In some embodiments of the invention, the default sequencing (order) of the nodes 412 can be naively pulled from the order of the code elements 410 in the post-process code 418, in a similar manner as for the pre-process code 408. In some embodiments of the invention, this naive approach is replaced by the placement module 216 (discussed further with respect to FIG. 8). In some embodiments of the invention, each of the code elements 410 is mapped to a single node of the nodes 412. In some embodiments of the invention, two or more of the code elements 410 are mapped to a same node of the nodes 412 (as shown). Here, the first element ("keep=nms( . . . )") maps to the first node ("bbox nms"), while the remaining three elements ("bboxes . . . inds . . . bboxes . . . ") map to the second node ("nd-array filtering"). These mappings are provided for ease of discussion, it should be understood that other mappings are possible and within the contemplated scope of the disclosure.

Figure 5:
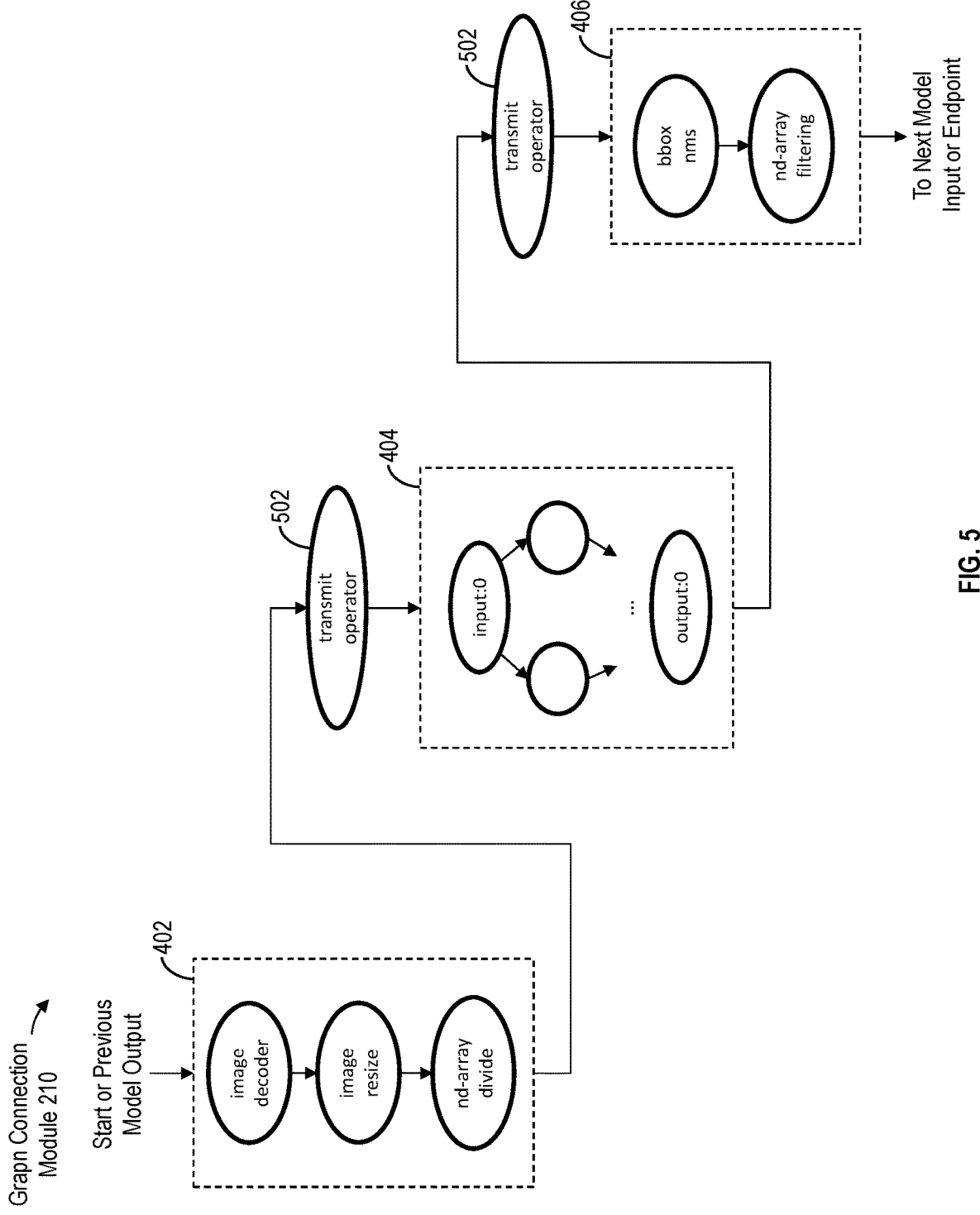
FIG. 5 illustrates an example graph connection module in accordance with one or more embodiments of the present invention.

In some embodiments of the invention, the graph connection module 210 is configured to receive the conversion data 254 (e.g., the pre-process graph 402, inference graph 404, and post-process graph 406) from the graph conversion module 208. In some embodiments of the invention, the graph connection module 210 is further configured to communicatively couple (connect) the pre-process graph 402, inference graph 404, and post-process graph 406 using one or more transmit operators 502. In some embodiments of the invention, the connected graphs are stored as connection data 256. FIG. 5 provides a more detailed view of the graph connection module 210.

In some embodiments of the invention, the transmit operators 502 provide a mechanism to connect nodes/graphs in the conversion data 254. In some embodiments of the invention, each of the transmit operators 502 includes an input node (or graph), an output node (or graph), and one or more data transmit options (e.g., TCP, direct memory access, etc.).

In some embodiments of the invention, the default placement of the transmit operators 502 is at the interface between the various graphs stored in the conversion data 254 (as shown). For example, transmit operators 502 can be placed between an output of the pre-process graph 402 and an input of the inference graph 404. In some embodiments of the invention, this naive approach is replaced by the placement module 216 (discussed further with respect to FIG. 8).

While shown as connecting nodes and graphs for a single model for convenience, it should be understood that the connection process can be arbitrarily repeated. For example, the input to the first node (e.g., the "image decoder" of the pre-process graph 402) can itself be the output of a previous model. Similarly, the output from the last node (e.g., the "nd-array filtering" of the post-process graph 406) can itself be the input to a next model. In this manner, the graph connection module 210 can be used to communicatively couple any number of models within a single deployment framework. All such configurations are within the contemplated scope of the disclosure.

In some embodiments of the invention, the pipeline deployment module 212 is configured to receive the connection data 256 from the graph connection module 210. In some embodiments of the invention, the pipeline deployment module 212 is further configured to deploy (initialize) a pipeline path (e.g., naïve pipeline path 602 or modified pipeline path 604) based on the available resources and communication overhead between child nodes/graphs in the pipeline path. In some embodiments of the invention, the naïve pipeline path 602 is defined as the path that is generated using the naturally offered node placements using the default transmit operator placement. A modified pipeline path 602 is also possible, whereby the nodes and/or transmit operators are rearranged to improve efficiency (i.e., lower latency). The modified pipeline path 602 is discussed in greater detail with respect to FIG. 8. In either case, the selected pipeline path can be stored as pipeline deployment 258.

Figure 7:
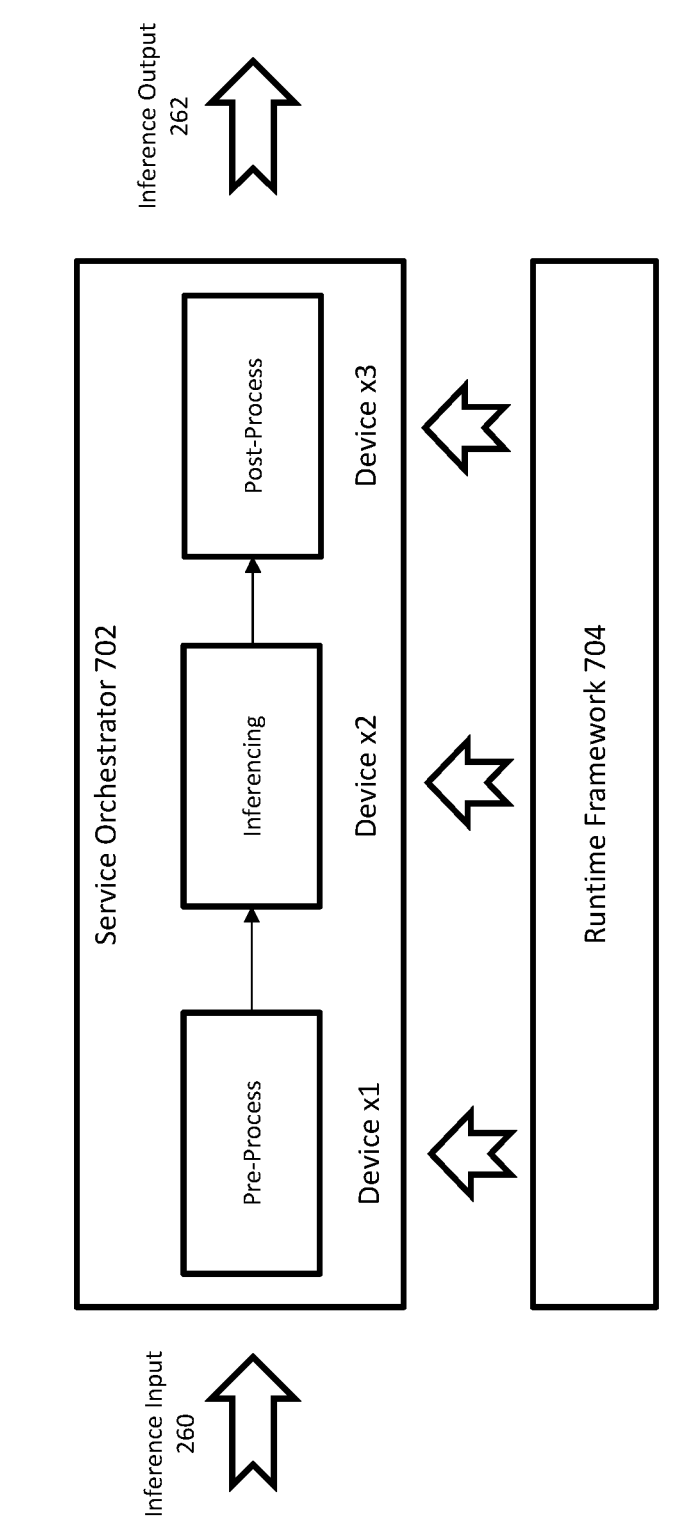
FIG. 7 illustrates an example service module in accordance with one or more embodiments of the present invention.

In some embodiments of the invention, the service module 214 is configured to receive the pipeline deployment 258 from the pipeline deployment module 212. FIG. 7 provides a more detailed view of the service module 214. In some embodiments of the invention, the service module 214 includes a service orchestrator 702 configured to manage the pipeline deployment 258, the inference input 260, and the inference output 262. The inference input 260 and inference output 262 refer, respectively, to the raw input data sent for inference (e.g., incoming from the computer systems 204 of a client) and the post-processed output data of the inference (e.g., after post-processing the raw output data from the respective AI model).

In some embodiments of the invention, the service orchestrator 702 includes one or more devices or modules for each of the nodes and/or graphs within the pipeline deployment 258 (shown simply as "pre-process", "inferencing", and "post-process" for convenience). In some embodiments of the invention, the service module 214 also includes a runtime framework 704 coupled to the service orchestrator 702. In some embodiments of the invention, the runtime framework 702 includes a consistent, independent, and extensible runtime for graph execution. As used herein, a "consistent" runtime refers to the fact that the runtime framework 704 is common (shared) between all portions of the service orchestrator 702). As used herein, an "independent" runtime refers to the fact that the runtime framework 704 does not rely or otherwise depend on the data structures of the inference input 260 and/or inference output 262. As used herein, an "extensible" runtime refers to the fact that the runtime framework 704 can be arbitrarily extended to account for any variations in the service orchestrator 702 (additional nodes, graphs, models, etc.).

Figure 8:
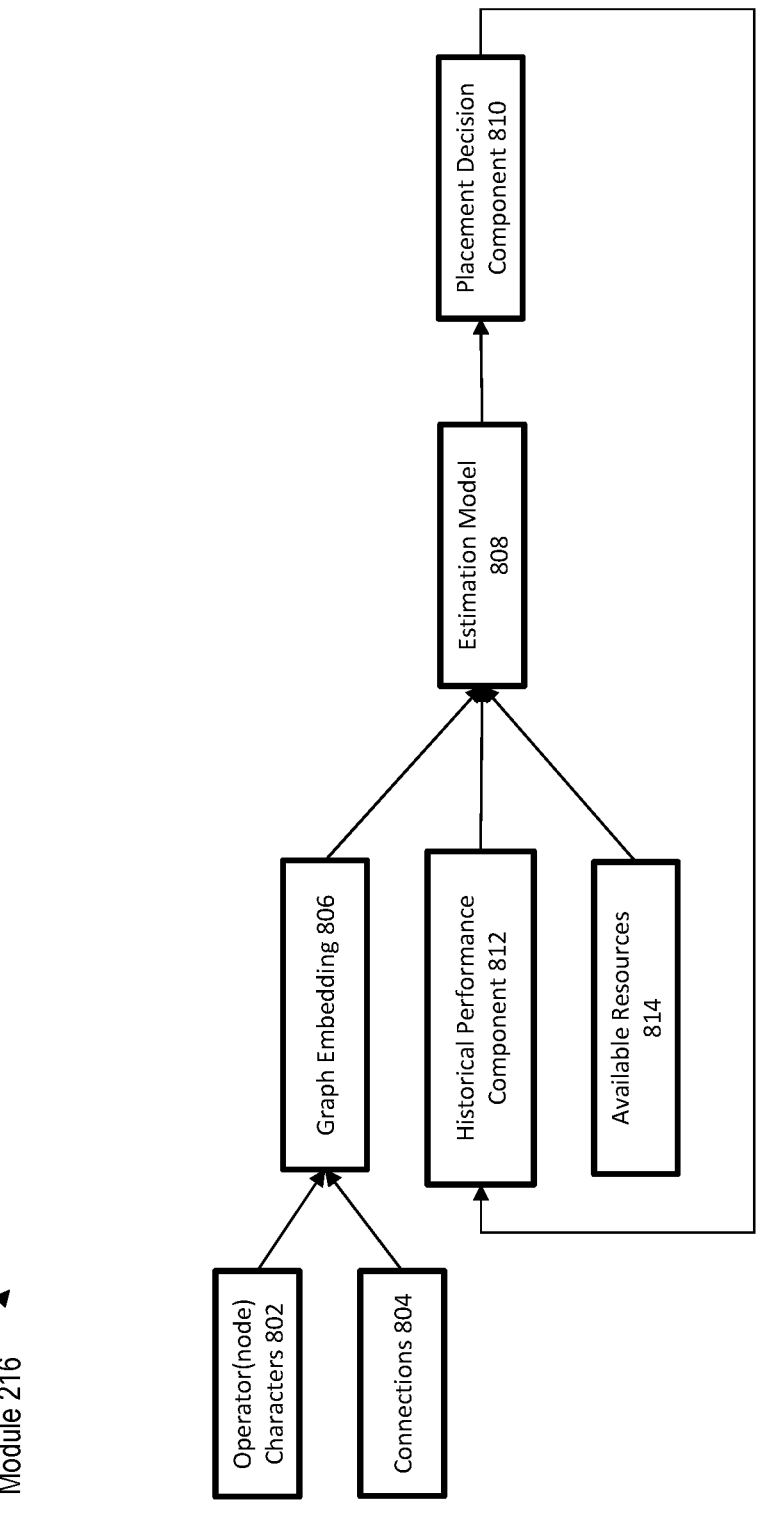
FIG. 8 illustrates an example placement module in accordance with one or more embodiments of the present invention.

In some embodiments of the invention, the dataflow 300 includes a placement module 216. In some embodiments of the invention, the placement module 216 is incorporated within one or both of the graph connection module 210 and the pipeline deployment module 212. In some embodiments of the invention, the placement module 216 is a stand-alone module within the dataflow 300. FIG. 8 provides a more detailed view of the placement module 216.

Figure 6:
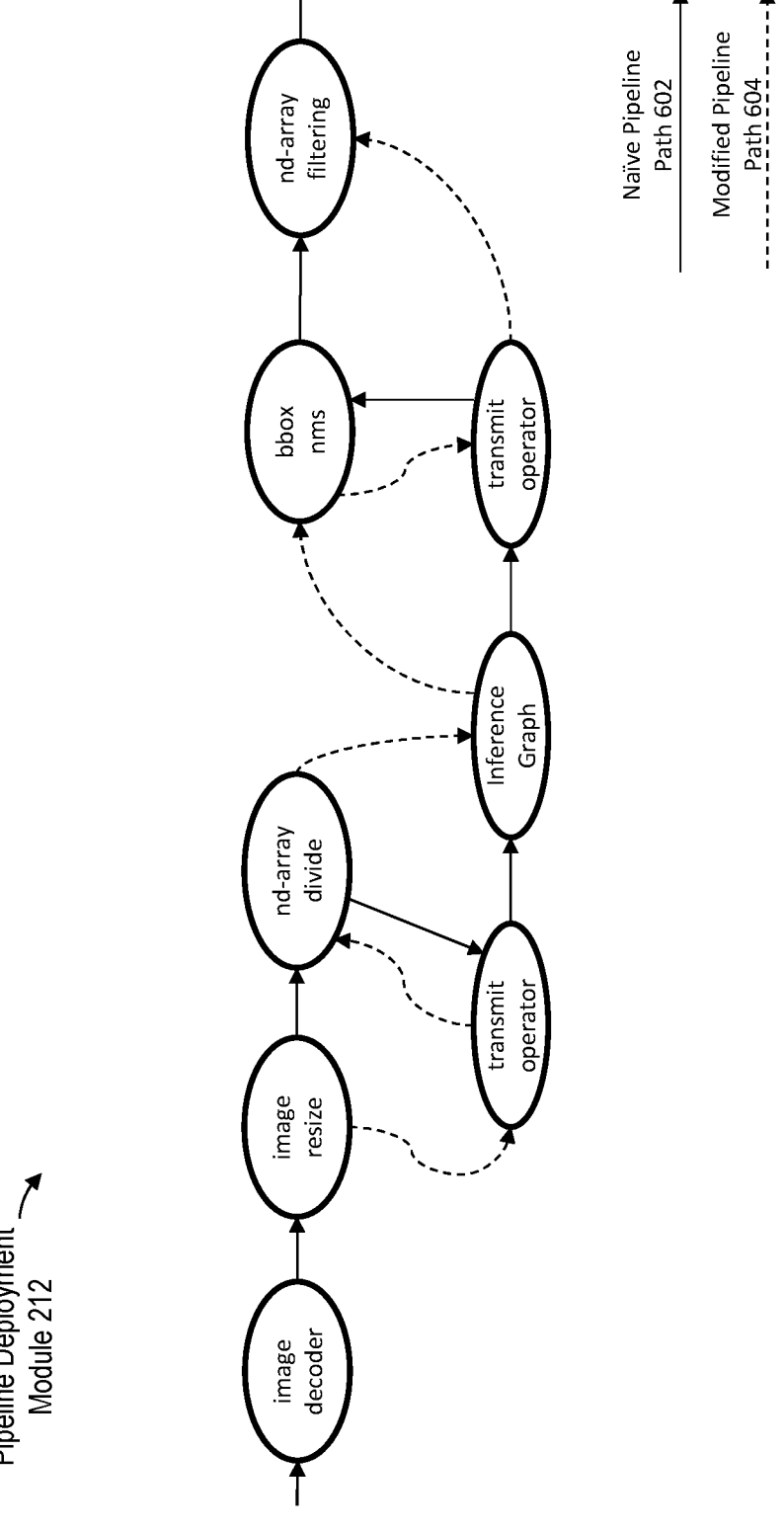
FIG. 6 illustrates an example pipeline deployment module in accordance with one or more embodiments of the present invention.

In some embodiments of the invention, the placement module 216 is configured to modify the naive pipeline path 602. The resultant path is referred to as the modified pipeline path 604. In some embodiments of the invention, the modified pipeline path 604 is built by changing the relative order of one or more of the nodes 412 (e.g., the relative order of the nodes 412 of the pre-process graph 402). In some embodiments of the invention, the modified pipeline path 604 is built by changing the placement of one or more of the transmit operators 502. In some embodiments of the invention, the modified pipeline path 604 is built by changing the relative order of one or more of the nodes 412 as well as the placement of one or more of the transmit operators 502. FIG. 6 illustrates an example of naïve pipeline 602 and a modified pipeline 604 for ease of discussion. Other configurations are possible. As shown in FIG. 6, the placement of the transmit operators has been moved between various nodes in the workflow.

In some embodiments of the invention, the placement module 216 includes one or more components configured to make pathing decisions (i.e., to evaluate various pathing options for efficiency and/or latency). For example, the placement module 216 can include an operator (node) characters 802, connections 804, a graph embedding 806, an estimation model 808, a placement decision component 810, a historical performance component 812, and available resources 814, configured and arranged as shown. Other configurations are possible.

In some embodiments of the invention, the operator (node) characters 802 and connections 804 contain node and connection data, respectively, of the dataflow 300. In some embodiments of the invention, the graph embedding 806 contains a snapshot of the current iteration of the pipeline (as shown, for example, in FIG. 6). In some embodiments of the invention, the estimation model 808 is configured as a cost model that estimates an end-to-end latency for inference, based on which an efficient graphed model placement policy can be decided by the placement decision component 810. In some embodiments of the invention, the historical performance component 812 includes historical and/or simulated placement structures and performance metrics. For example, the historical performance component 812 can include a previous model deployment and associated performance metrics (e.g., latency data).

In some embodiments of the invention, the end-to-end latency for the current iteration of the pipeline (e.g., the current node and transmit operator locations) is estimated by the estimation model 808 based on the structure of the current iteration of the pipeline and the performance metrics for one or more historical or simulated placement structures having the same nodes or relative connectivity between nodes as the current iteration of the pipeline. In some embodiments of the invention, end-to-end latency is estimated by breaking down (fragmenting) the current iteration of the pipeline into smaller subgraphs until all matching nodes/connections are found in the historical and/or simulated records and summing the latency effects of all of the historical/simulated models.

In some embodiments of the invention, available resources 814 can be leveraged to further improve efficiency. For example, consider a model or a pipeline of models that serves for a long time, dedicated to a particular purpose workload. When this model (or pipeline) is idle, normally the respective model service will scale down to 0 to reduce resource occupation. In some embodiments of the invention, a dynamic placement policy can be built that accounts for the available resources 814 and the historical placement performance for the same model.

Referring now to FIG. 9, a flowchart 900 for efficiently deploying an AI model is generally shown according to an embodiment. The flowchart 900 is described in reference to FIGS. 1-8 and may include additional blocks not depicted in FIG. 9. Although depicted in a particular order, the blocks depicted in FIG. 9 can be rearranged, subdivided, and/or combined. At block 902, an AI model deployment input is received. In some embodiments of the invention, the AI model deployment input includes pre-process code, inference model code, and post-process code.

At block 904, the pre-process code is converted to a pre-process graph. In some embodiments of the invention, converting the pre-process code to a pre-process graph includes generating one or more pre-process nodes. In some embodiments of the invention, each pre-process node is associated with a code element in the pre-process code.

At block 906, the inference model is converted to an inference graph. In some embodiments of the invention, the inference model is a machine learning model having one or more nodes distributed among one or more hidden layers. In some embodiments of the invention, the nodes of the inference model define a graph.

At block 908, the post-process code is converted to a post-process graph. In some embodiments of the invention, converting the post-process code to a post-process graph includes generating one or more post-process nodes. In some embodiments of the invention, each post-process node is associated with a code element in the post-process code.

At block 910, a pipeline path is generated by connecting nodes in the pre-process graph, the inference graph, and the post-process graph. In some embodiments of the invention, the pipeline path is an initial (naïve path). In some embodiments of the invention, generating the pipeline path includes connecting nodes in the pre-process graph, the inference graph, and the post-process graph to one or more transmit operators.

At block 912, the pipeline path is deployed as a service for inference. In some embodiments of the invention, the service is configured to provide, in response to receiving an inference input, an inference output. In some embodiments of the invention, the inference input includes raw data received from a remote system (e.g., client) prior to pre-processing.

The method can further include generating a modified pipeline path by relocating a position of a transmit operator in the pipeline path. In some embodiments of the invention, a cost model estimates an improvement in an end-to-end latency of the service by switching from the pipeline path to the modified pipeline path. In some embodiments of the invention, the end-to-end latencies are estimated from historical or simulated data. In some embodiments of the invention, the historical or simulate data includes prior graph-based pipelines having the same (or a subset of the same) nodes and/or connectivity between nodes.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
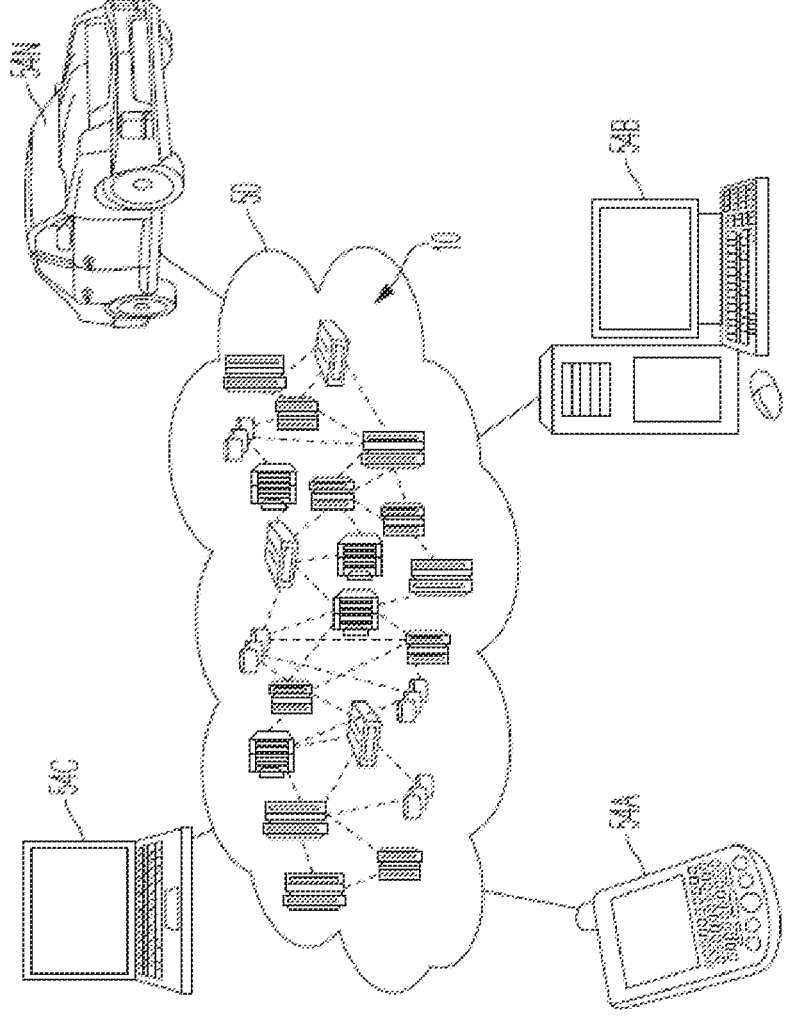
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 11:
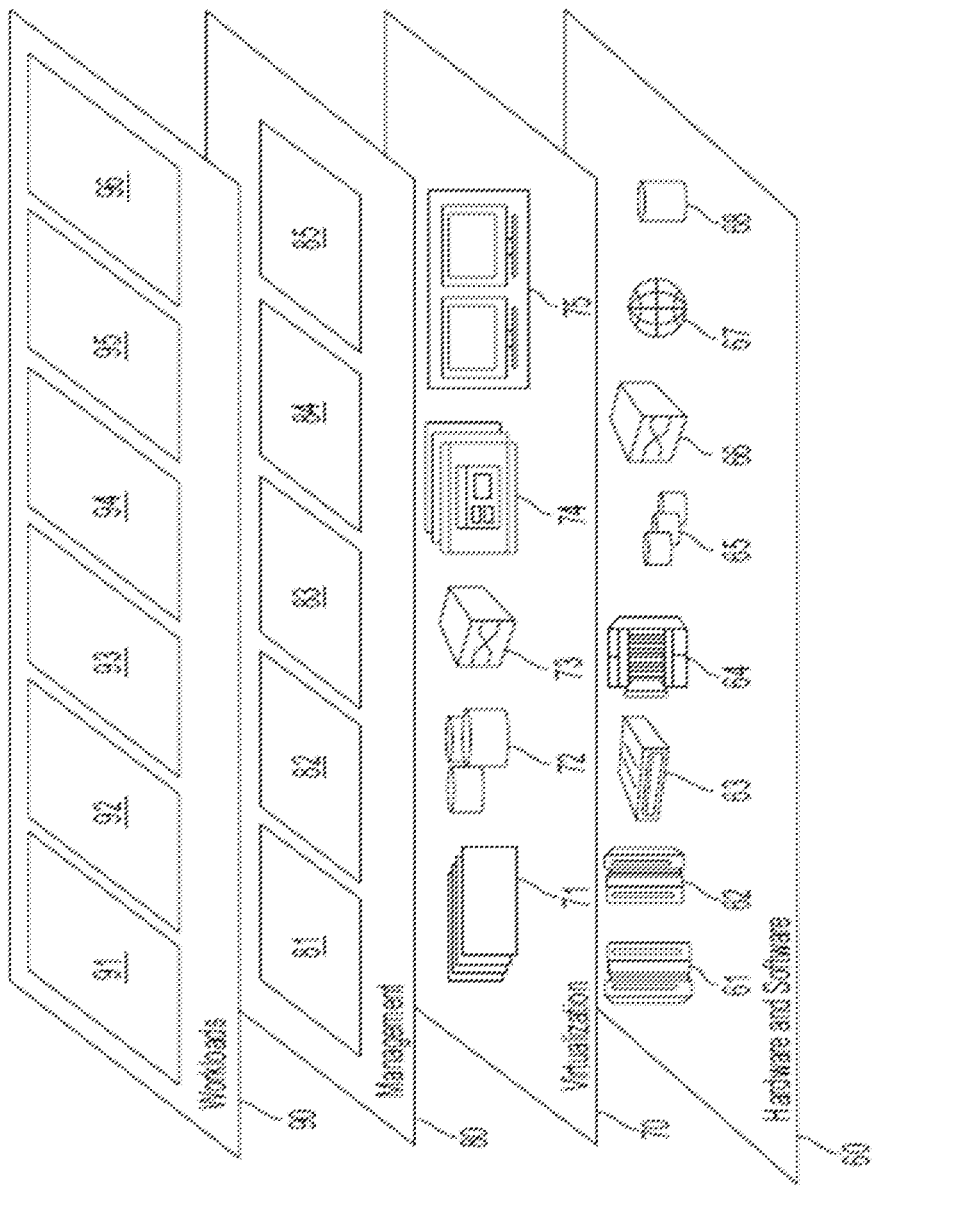
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving an artificial intelligence (AI) model deployment input for a mixed-model inferencing pipeline, the AI model deployment input comprising pre-process code defined using a first codebase, inference model code, and post-process code defined using a second codebase;
converting the pre-process code to a pre-process graph by mapping code elements of the pre-process code to nodes of the pre-process graph;
converting the inference model code to an inference graph by mapping hidden layers of the inference model to nodes of the inference graph;
converting the post-process code to a post-process graph by mapping code elements of the post-process code to nodes of the post-process graph;
generating a pipeline path by connecting nodes in the pre-process graph, the inference graph, and the post-process graph, and converting the mixed-model inferencing pipeline into a graphed model independent of runtime type for execution;
reducing an end-to-end latency of the pipeline path by relocating a position of at least one node in the pipeline path according to an output of a cost model trained to estimate end-to-end latency for inference of a plurality of node configurations each comprising a different relative position of the respective nodes; and
deploying the pipeline path as a service for inference, wherein the service includes a runtime framework comprising a consistent, independent, and extensible runtime for graph execution, the runtime framework configured to provide, in response to receiving an inference input, an inference output independently of data structures of the inference input and the inference output.

2. The computer-implemented method of claim 1, wherein the inference input comprises raw data received from a remote system prior to pre-processing.

3. The computer-implemented method of claim 1, wherein converting the pre-process code to a pre-process graph comprises generating one or more pre-process nodes, wherein each pre-process node is associated with a code element in the pre-process code.

4. The computer-implemented method of claim 3, wherein converting the post-process code to a post-process graph comprises generating one or more post-process nodes, wherein each post-process node is associated with a code element in the post-process code.

5. The computer-implemented method of claim 4, wherein generating a pipeline path comprises connecting nodes in the pre-process graph, the inference graph, and the post-process graph to one or more transmit operators.

6. The computer-implemented method of claim 5 further comprising generating a modified pipeline path by relocating a position of a transmit operator in the pipeline path.

7. The computer-implemented method of claim 6, wherein a cost model estimates an improvement in an end-to-end latency of the service by switching from the pipeline path to the modified pipeline path.

8. A system comprising a memory having computer readable instructions and one or more processors for executing the computer readable instructions, the computer readable instructions controlling the one or more processors to perform operations comprising:
receiving an artificial intelligence (AI) model deployment input for a mixed-model inferencing pipeline, the AI model deployment input comprising pre-process code defined using a first codebase, inference model code, and post-process code defined using a second codebase;
converting the pre-process code to a pre-process graph by mapping code elements of the pre-process code to nodes of the pre-process graph;
converting the inference model code to an inference graph by mapping hidden layers of the inference model to nodes of the inference graph;
converting the post-process code to a post-process graph by mapping code elements of the post-process code to nodes of the post-process graph;
generating a pipeline path by connecting nodes in the pre-process graph, the inference graph, and the post-process graph, and converting the mixed-model inferencing pipeline into a graphed model independent of runtime type for execution;
reducing an end-to-end latency of the pipeline path by relocating a position of at least one node in the pipeline path according to an output of a cost model trained to estimate end-to-end latency for inference of a plurality of node configurations each comprising a different relative position of the respective nodes; and
deploying the pipeline path as a service for inference, wherein the service includes a runtime framework comprising a consistent, independent, and extensible runtime for graph execution, the runtime framework configured to provide, in response to receiving an inference input, an inference output independently of data structures of the inference input and the inference output.

9. The system of claim 8, wherein the inference input comprises raw data received from a remote system prior to pre-processing.

10. The system of claim 8, wherein converting the pre-process code to a pre-process graph comprises generating one or more pre-process nodes, wherein each pre-process node is associated with a code element in the pre-process code.

11. The system of claim 10, wherein converting the post-process code to a post-process graph comprises generating one or more post-process nodes, wherein each post-process node is associated with a code element in the post-process code.

12. The system of claim 11, wherein generating a pipeline path comprises connecting nodes in the pre-process graph, the inference graph, and the post-process graph to one or more transmit operators.

13. The system of claim 12 further comprising generating a modified pipeline path by relocating a position of a transmit operator in the pipeline path.

14. The system of claim 13, wherein a cost model estimates an improvement in an end-to-end latency of the service by switching from the pipeline path to the modified pipeline path.

15. A computer program product comprising a computer readable storage medium having program instructions embodied therewith, the program instructions executable by one or more processors to cause the one or more processors to perform operations comprising:

receiving an artificial intelligence (AI) model deployment input for a mixed-model inferencing pipeline, the AI model deployment input comprising pre-process code defined using a first codebase, inference model code, and post-process code defined using a second codebase;

converting the pre-process code to a pre-process graph by mapping code elements of the pre-process code to nodes of the pre-process graph;

converting the inference model code to an inference graph by mapping hidden layers of the inference model to nodes of the inference graph;

converting the post-process code to a post-process graph by mapping code elements of the post-process code to nodes of the post-process graph;

generating a pipeline path by connecting nodes in the pre-process graph, the inference graph, and the post-process graph, and converting the mixed-model inferencing pipeline into a graphed model independent of runtime type for execution;

reducing an end-to-end latency of the pipeline path by relocating a position of at least one node in the pipeline path according to an output of a cost model trained to estimate end-to-end latency for inference of a plurality of node configurations each comprising a different relative position of the respective nodes; and deploying the pipeline path as a service for inference, wherein the service includes a runtime framework comprising a consistent, independent, and extensible runtime for graph execution, the runtime framework configured to provide, in response to receiving an inference input, an inference output independently of data structures of the inference input and the inference output.

16. The computer program product of claim 15, wherein the inference input comprises raw data received from a remote system prior to pre-processing.

17. The computer-implemented method of claim 16, wherein converting the pre-process code to a pre-process graph comprises generating one or more pre-process nodes, wherein each pre-process node is associated with a code element in the pre-process code.

\* \* \* \* \*